US012587384B2

(12) United States Patent
Olsen

(10) Patent No.: US 12,587,384 B2
(45) Date of Patent: Mar. 24, 2026

(54) METHOD AND APPARATUS FOR TRACKING THE CREATIVE PROCESS

(71) Applicant: Is Not AI, LLC, Scottsdale, AZ (US)

(72) Inventor: Michael J. Olsen, Phoenix, AZ (US)

(73) Assignee: Is Not AI, LLC, Scottsdale, AZ (US)

( * ) Notice: Subject to any disclaimer, the term of this patent is extended or adjusted under 35 U.S.C. 154(b) by 90 days.

(21) Appl. No.: 18/412,917

(22) Filed: Jan. 15, 2024

(65) Prior Publication Data

US 2024/0243919 A1 Jul. 18, 2024

Related U.S. Application Data

(60) Provisional application No. 63/479,866, filed on Jan. 13, 2023.

(51) Int. Cl.
H04L 9/32 (2006.01)
H04L 9/00 (2022.01)
(52) U.S. Cl.
CPC .......... H04L 9/3239 (2013.01); H04L 9/3247 (2013.01); H04L 9/50 (2022.05); H04L 2209/60 (2013.01)

(58) Field of Classification Search
CPC ....... H04L 9/3239; H04L 9/3247; H04L 9/50; H04L 2209/60
See application file for complete search history.

(56) References Cited

U.S. PATENT DOCUMENTS

| | | | | |
|---|---|---|---|---|
| 2021/0279305 A1* | 9/2021 | Goldston | ................ | G06F 16/41 |
| 2021/0326308 A1* | 10/2021 | Wylie | ................... | G06F 16/176 |
| 2021/0343262 A1* | 11/2021 | Zavesky | ................ | H04L 63/12 |
| 2022/0029785 A1* | 1/2022 | Miller | ................... | H04L 9/3247 |

* cited by examiner

*Primary Examiner* — Azizul Choudhury
(74) *Attorney, Agent, or Firm* — Noblitt & Newson, PLLC

(57) ABSTRACT

Methods and apparatus for tracking a creative process include a remotely accessible content server and storage device for storing and processing data corresponding to the creation of a new project. User input data from one or more editing sessions may be uploaded to the content server and saved as editing information. An audit trail may be generated according to the collected editing information from each editing session. The audit trail may be forwarded directly to a reviewer or may be used by a verification system to generate a score corresponding to a likelihood that the projected was created without the use of artificial intelligence systems or bots.

16 Claims, 4 Drawing Sheets

Finished

Ready to
Publish?
Yes No — 202

Convert

— 204

Blockchain Transaction — 112

Smart Contract    NFT    Wallet 114

Document Stamped

— 206

Document Verification Diagram

METHOD AND APPARATUS FOR TRACKING THE CREATIVE PROCESS

CROSS REFERENCES TO RELATED APPLICATIONS

This application claims the benefit of U.S. Provisional Patent Application No. 63/479,866, filed Jan. 13, 2023, and incorporates the disclosure of the application by reference.

BACKGROUND OF THE TECHNOLOGY

Artificial intelligence ("AI") is a branch of computer science that works on creating computer systems that are intended to be capable of emulating a human being. Large language models (LLMs) or AI text generators are computerized robots ("bots") used to generate text content in response to a text prompt. Bots may be programmed to perform any task with an underlying goal of making the completed task appear to have been created by or indistinguishable from content generated by a human. This artificially generated content has become easily accessible to anyone that has an internet connection. Now, anyone can generate essays, articles, song lyrics, or images with little to no effort or creative input. Screenplays, entire novels, art galleries and even software can be generated instantly with a few clicks.

For example, an AI bot could be used to write essays, articles, stories, poems, or software. It is even possible for a student to have an entire essay written on any topic in a few minutes with minimal chances that plagiarism software could detect that the content was written by an AI bot rather than the student. In an academic setting the potential for misuse becomes self-evident.

AI generated content is not necessarily bad but when used as the sole source of the creative process it will begin to erode what makes humans unique. While these tools may be able to provide quick answers to questions or generate large amounts of unique content, it does not build critical thinking and problem solving skills for the user. With reference again to an academic setting, students will not have to put time and effort into researching and writing essays, or other works requiring research and critical thinking. The potential impacts on the educational system are enormous.

To combat the use of bots, some universities and schools have outright banned their use. Due to the difficulty in preventing their use, however, some efforts to prevent the use of bots have included requiring students to hand write essays or banning access to these programs or websites on school networks. Nevertheless, AI tools will continue to evolve and emulate humans more accurately, with each new version becoming more and more sophisticated. Unlike existing systems directed towards detecting plagiarism, current processes or attempts to detect content written by an AI bot involve picking up on algorithmic nuances or watermarks in the generated content. While this might work to some degree in the short term, detection by these methods will always lag behind the massive models that are designed to act more and more like humans.

SUMMARY OF THE TECHNOLOGY

Methods and apparatus for tracking a creative process include a remotely accessible content server and storage device for storing and processing data corresponding to the creation of a new project. User input data from one or more editing sessions may be uploaded to the content server and saved as editing information. An audit trail may be generated according to the collected editing information from each editing session. The audit trail may be forwarded directly to a reviewer or may be used by a verification system to generate a score corresponding to a likelihood that the projected was created without the use of artificial intelligence systems or bots.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures. For simplicity and clarity of illustration, elements in the figures are not necessarily drawn to scale.

DETAILED DESCRIPTION OF THE DRAWINGS

The present technology may be described in terms of functional block components and various processing steps. Such functional blocks may be realized by any number of components configured to perform the specified functions and achieve the various results. For example, the present technology may employ various types of computer systems, data storage devices, databases, and the like, which may carry out a variety of functions. Further, the present technology may employ any number of conventional techniques for tracking actions of one or more persons, logging tracked actions, and predicting performance of an individual.

The disclosed technology is directed towards combatting the use of AI bots in the creative process by comparing and contrasting how AI systems generate new content against how humans create new content. For example, AI based machines that produce automated content such as text, images, or code do not go through the same creative process that a human does. Because AI machines are based on software that utilize algorithms, they produce content instantly by using predictive mathematics and LLMs. Conversely, humans most often go through a multistep iterative process when creating new content. With few exceptions, humans behave uniquely when working on creative content. There is an initial concept creation stage of adding words and deleting them followed by an editing process. Throughout this process, the human may move a cursor to various positions, save various drafts of the file, and come back to work on it at a different time to make revisions or add new content. Eventually, the iterative process is completed and an end product is produced.

One representative example may involve a student writing a paper for class. The disclosed technology creates a ledger of how much time a student spent working on the paper from the initial draft, through the editing process, and ultimately its completion. The ledger may be used by another person reviewing or grading the paper to determine if the student copied and pasted content from another source or actually spent time working on creating the content. For example, if the ledger shows that a large portion of text was pasted into the document all at once rather than over a period of time through typing, the technology may generate a flag that the content may not have been written by the student and requires additional scrutiny. Alternatively, the technology may note the amount of copied material and compare it against a predetermined scale to see if it fits within acceptable parameters.

Figure 1:
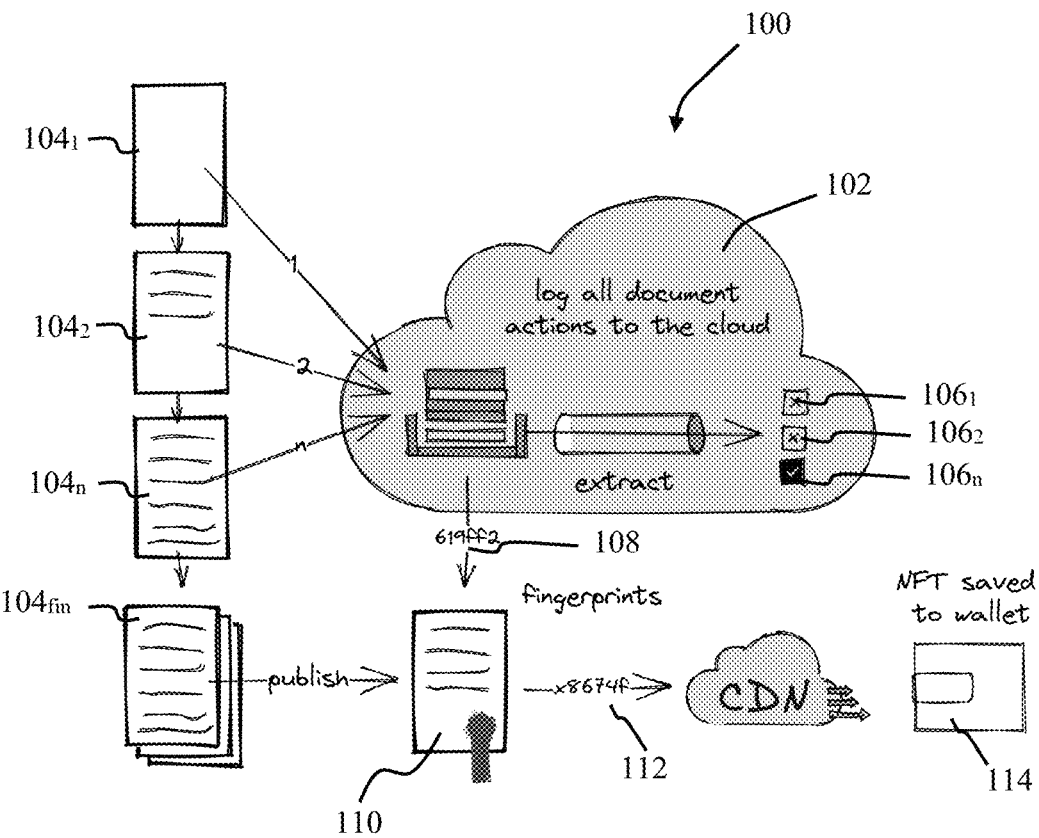
FIG. 1 representatively illustrate a block diagram of a system for tracking the creative process in accordance with an exemplary embodiment of the present technology.

In operation, and with reference now to FIG. 1, in one representative embodiment, a system for tracking the creative process 100 may comprise a remote cloud-based server linked to a user's computing device over a network. A ledger creation module 102 may be configured to track the creation process of a new project, e.g., an essay, from an initial draft $104_1$ created in an initial editing session through one or more iterations $104_{1-n}$ generated in subsequent editing sessions. For each editing session, the ledger creation module 102 may record any suitable data relating to the creation of the essay, including individual users edits, and save the information as editing information. For example, metadata relating to particular actions (edits) taken by the user may be recorded and uploaded from the user's computing device to the ledger creation module 102 where the editing information is stored in connection with the corresponding editing session. The user edits saved as editing information may include any desired criteria such as specific keystrokes, mouse clicks, material that is pasted directly into the document and any subsequent edits to that material. Editing information may also include details such as typing speed, the manner and timing in which specific edits or changes are made. One of skill in the art will recognize that the type of editing information of interest may vary depending on the type of project involved.

The ledger creation module 102 may also be configured to add unique identifying data to the document making up the essay. For example, the ledger creation module 102 may store information such as a unique document ID, file type, and chain of custody references into the metadata of the document itself that can be used later to validate the document.

The user may be able to save their document and reopen as often as necessary in new editing sessions during the drafting/editing process with the ledger creation module 102 documenting each editing session in addition to the changes or edits associated with each editing session. The ledger creation module 102 may also be configured to generate a differential hash $106_{1-n}$ with each draft $104_{1-n}$ to ensure that the newly opened document has not been modified since it was previously closed to provide a complete chain of custody of the document between editing sessions.

The editing sessions, and editing information associated with each session, may be used to generate an audit trail. This audit trail provides detail into the creation process used to generate the completed project. The audit trail may also be used alone or in part to determine the extent to which any artificial intelligence system or bots may have been used in the creation process. For example, as described below, the audit trail may make up at least a portion of one or more hashes.

Once the user has completed the final draft $104_{fin}$, the ledger creation module 102 may generate a unique final hash or digital fingerprint 108 for the chain of custody and ledger data. The final hash 108 in combination with a final differential hash will then uniquely define both the content and the creation processes that resulted in the final document $104_{fin}$. In one embodiment, the two hashes may then be combined to generate a unique non-fungible token (NFT) 112 that represents the completed document and can be saved on a blockchain and transferred to a user's digital wallet 114.

Figure 2:
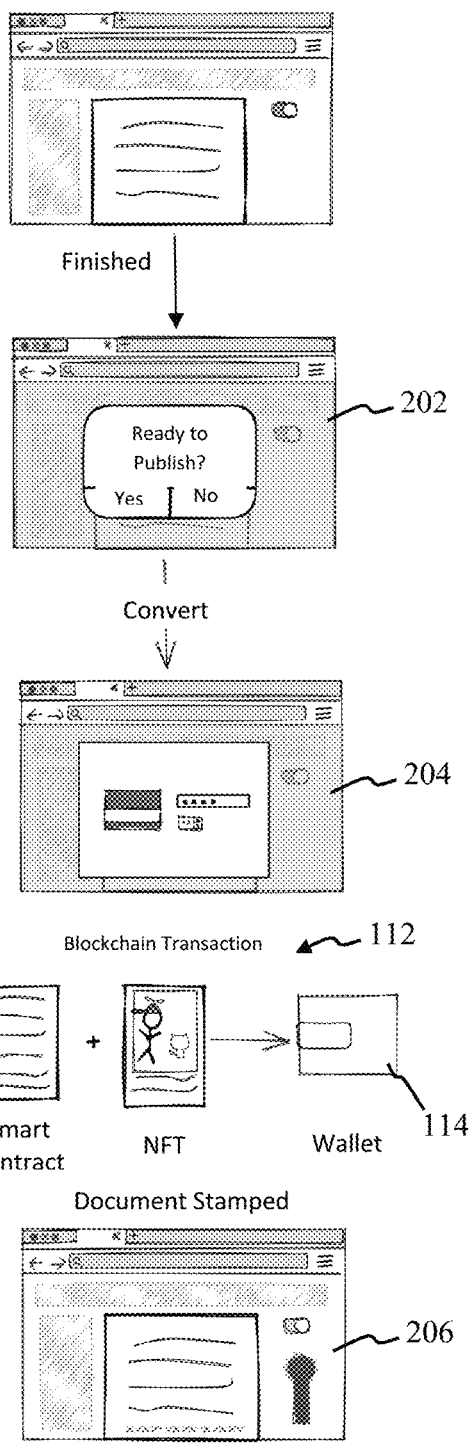
FIG. 2 representatively illustrates a block diagram of a publishing process in accordance with an exemplary embodiment of the present technology.

Referring now to FIG. 2, once a document is completed, the user will publish the document for review or grading. In one embodiment, the document may be published prior to completion so that it may be reviewed. For example, rough drafts of term papers or essays are often reviewed part way through the drafting period. The ledger creation module 102 may allow for an interim review by allowing access to any existing saved editing sessions.

In one embodiment, publication of the completed project involves a sealing process 202 for the document. The sealing process 202 finalizes the chain of custody and calculates the final differential hash and the final chain of custody hash 108. The user is then prompted to publish the document 204 so that the NFT 112 is generated from the hashes and linked to a public content distribution network (CDN). An image is generated based on the unique hashes and a transaction is made transferring the NFT 112 to the user's verified wallet 114 address. The transaction information is stamped onto the document at the end of the file via the browser extension and the document is marked as sealed 206. The stamp is not part of the digital fingerprint 108 and can be removed from the document when distributed as it is not required to look the document up. In an alternative embodiment where a complete chain of custody isn't required or the additional security provided by a NFT is necessary, the sealing process of the completed project may simply include the final differential hash including the audit trail and associated information.

The sealing process 202 may also initiate a process that compiles the chain of custody and associated editing sessions. Metadata from the editing sessions is collected and aggregated and stored along with the document data. This data can be used later to make a determination of originality and generate a human generation score.

Figure 3:
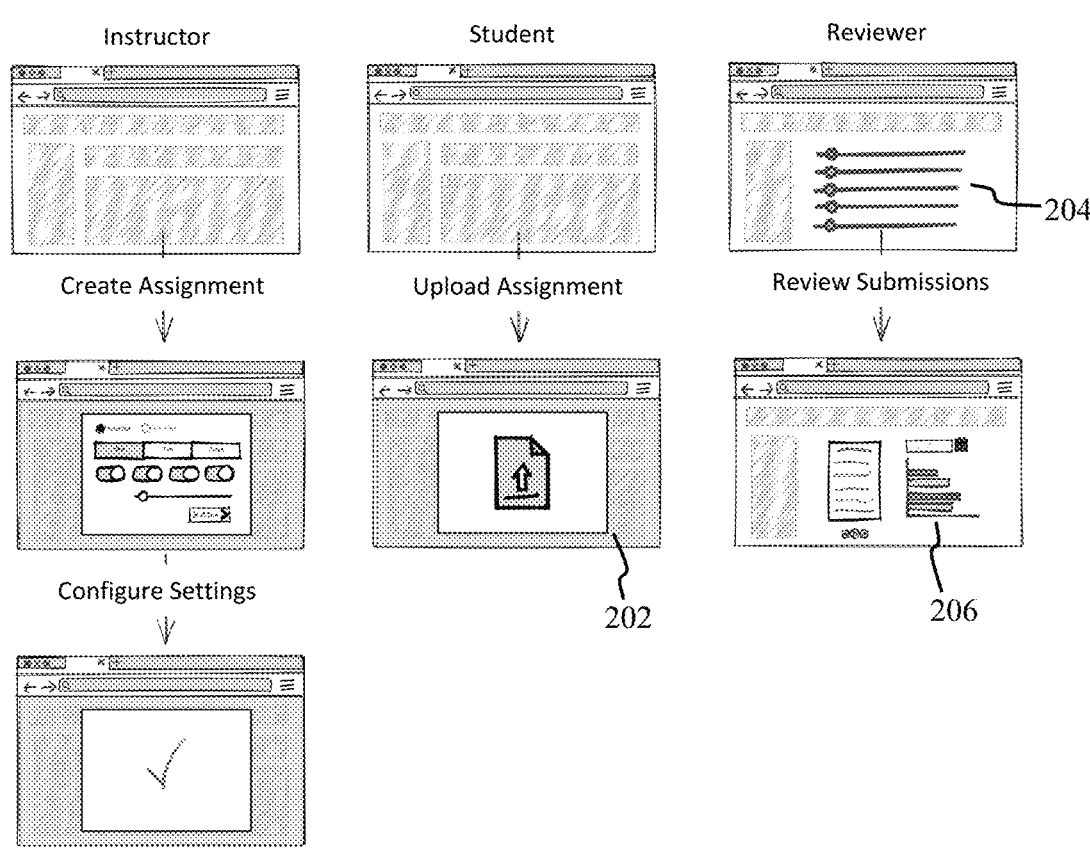
FIG. 3 representatively illustrates a block diagram of a document verification process in accordance with an exemplary embodiment of the present technology.

For example, and referring now to FIG. 3, the ledger creation module 102 may also include a document verification system 204 configured to analyze a submitted document and generate the human generation score which quantifies a likelihood of plagiarism or use of an AI bot. For example, after a document is uploaded 202, content may be extracted and if a transaction stamp is identified it is used to lookup the document information on the blockchain. The digital fingerprint 108 may then be verified against the content and the chain of custody digital fingerprint 108 is used to pull the chain of custody and aggregate editing information.

In generating the human generation score, the document verification system 204 may use a set of predetermined criteria to evaluate the document against and generate the human generation score along with highlighted sections showing an interactive heatmap across the document 206. For example, criteria used to evaluate a creation process may include factors such as: reviewing time stamps to determine a speed at which edits are made to a document and analyze the results to detect unusually fast or consistent patterns indicative of non-human behavior; the nature in which specific sections or portions of a document are edited over time to look for patterns of corrections; the complexity of edits to look for edits ranging from spelling corrections to sentence restructuring; language consistency; periods between edits or editing sessions; and cursor movement.

The document verification system 204 may also be configured to present the document in a manner that allows the reviewer to review the editing information in detail. For example, in a first representative embodiment, if a project was assigned as an essay of three paragraphs in length, and the editing information indicated that the second paragraph was completely copy pasted from an external source, in the review the document verification system 204 may highlight the "source" for the paragraph as being external for the whole block of text. In a second example, the document verification system 204 may be configured to provide the reviewer with the ability to look deeper in the editing information. Using the three paragraph example from above, the document verification system 204 may provide an indication that the second paragraph started as copy paste of external content but had significant edits after it was pasted into the document. The document verification system 204 may highlight the paragraph in color as a mixed sourced paragraph and could provide the reviewer with the ability to replay the edits to see what the original words were and how they actually changed over time.

Figure 4:
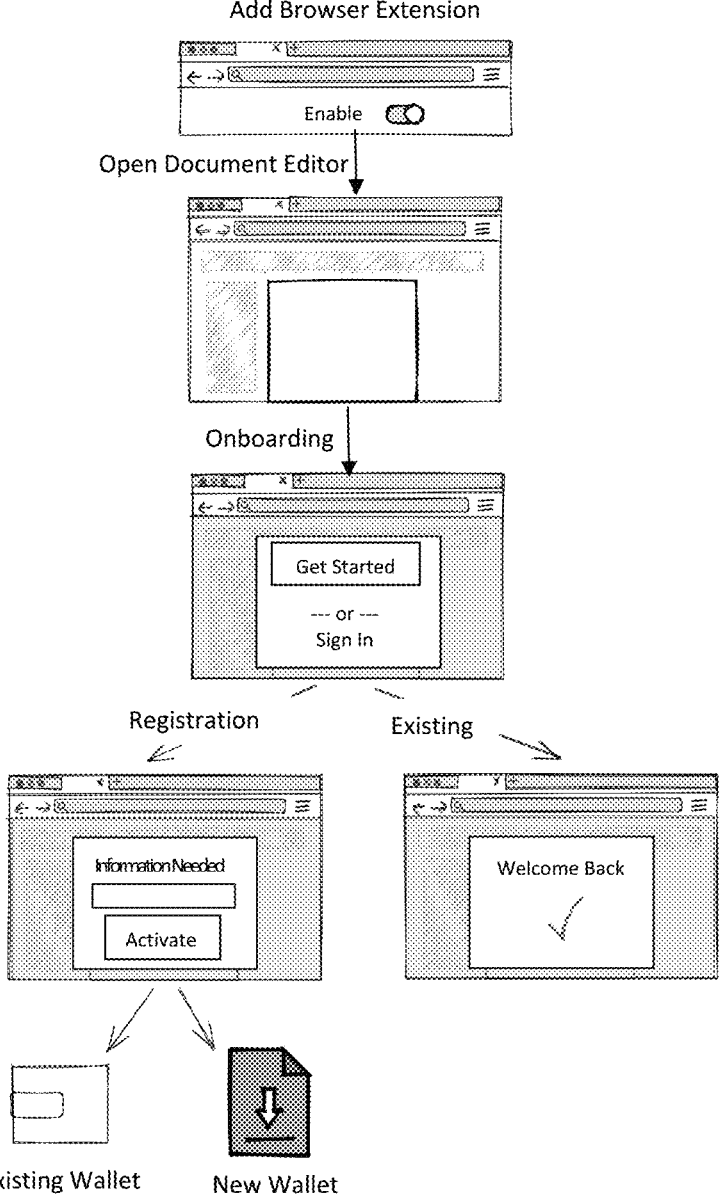
FIG. 4 representatively illustrates a block diagram of a log in process in accordance with an exemplary embodiment of the present technology.

The system for tracking the creative process 100 may be executed in any suitable format. In one embodiment, at least a portion of the system for tracking the creative process 100 may operate as a standalone software package on a user's computing device. In an alternative embodiment, a user may access the system for tracking the creative process 100 over a network as a hosted software application. For example, with reference now to FIG. 4, a user may access the system for tracking the creative process 100 via a browser extension. The extension may be configured to access one or more programs on the user's computing device, such as a word processing program. An icon may be displayed in the menu bar of the word processing program. A user clicking, or otherwise selecting the icon will begin an activation process.

On activation, the user may be prompted to sign in using a document account. A document session may then be initiated linking a user's digital wallet to the document session. Work on a new document may then begin or the user may select a previously stored document to continue the drafting process as described above. Once activated, the system may also be adapted to block or limit access to other programs, applications, or websites.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

As used herein, the terms "comprises," "comprising," or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A process for tracking a creative process for a project on a user's computing device, comprising:

initiating an initial editing session for the project between the user's computing device and a ledger creation module to capture a first set of user edits to the project during the initial editing session, wherein the project comprises a new original work being created by the user;

storing the captured user edits during the initial editing session on the ledger creation module as editing information;

ending the initial editing session in response to a command from the user's computing device;

allowing the creation of additional editing sessions by the user's computing device, wherein for each additional editing session the ledger creation module is configured to:

capture an additional set of user edits to the incomplete project; and store the captured additional set of user edits on the ledger creation module as additional editing information;

preventing additional editing sessions from being initiated in response from a command from the user's computing device that the new original work has been completed;

generating a reviewable audit trail for the project based on editing information from each editing session making up the project;

comparing the audit trail against a predetermined set of criteria indicative of the use of a non-human generated content generation system;

generating a human generation score to quantify a likelihood of the project being created without aid of an artificial intelligence system; and flagging one or more portions of the project for review when the comparison between the audit trail and predetermined set of criteria suggest the one or more flagged portions fall outside of acceptable editing parameters for the predetermined set of criteria.

2. A process for tracking a creative process for a project according to claim 1, further comprising establishing a communication link between the user's computing device and a remote server hosting the ledger creation module.

3. A process for tracking a creative process for a project according to claim 1, further comprising;

generating a differential hash at an end of each editing session, wherein the differential hash corresponds to the editing information for that editing session;

saving the differential hash on the user's device and the ledger creation module;

normalizing textual content of the project; and upon completion of the project generating:

a final differential hash based on each differential hash generated;

a digital fingerprint for the project.

4. A process for tracking a creative process for a project according to claim 3, wherein the differential hash is used at the beginning of a new editing session to confirm that the project on the user's device has not changed since a prior editing session.

5. A process for tracking a creative process for a project according to claim 3, wherein the digital fingerprint provides a complete chain of custody for the project.

6. A process for tracking a creative process for a project according to claim 3, further comprising:

sealing the project according to the final differential hash and the digital fingerprint;

publishing the sealed project in response to a command from the user's computing device;

generating a non-fungible token (NFT) for the sealed project; and uploading the NFT to a digital wallet.

7. A process for tracking a creative process for a project according to claim 6, further comprising a verification system configured to:

access all editing information associated with the final hash;

analyze the editing information associated with the audit trail and the digital fingerprint;

generate the human generation score; and flag the one or more portions of the project that fall outside of acceptable editing parameters.

8. A process for tracking a creative process for a project according to claim 7, further comprising:

providing a reviewer access to the project; and forwarding the human generation score for the project to the reviewer.

9. A process for tracking a creative process for a project according to claim 8, wherein the verification system is configured to highlight the flagged portions of the project that may have been generated by an artificial intelligence system.

10. A process for tracking a creative process for a project according to claim 9, wherein the verification system is configured to present edits performed on the highlighted portions of the project.

11. A process for tracking a creative process for a project according to claim 1, wherein flagging one or more portions of the project for review comprises showing an interactive heatmap over the flagged portions.

12. A system for alerting a reviewer to the detection of non-human generated content during creation of a new original project on a user's device, comprising:

a ledger creation module in communication with the user's device, wherein the ledger creation module is configured to:

capture user edits to the new original project during one or more editing sessions as editing information;

save the editing information associated with each editing session in response to a command from the user's computing device to end the editing session;

mark the new original project as complete or incomplete at the end of each editing session; and generate an audit trail for the completed project based on editing information from each editing session making up the completed project; and a verification system configured to:

access the audit trail associated with a completed new original project;

analyze the audit trail by comparing the editing information against a predetermined set of criteria indicative of the use of a non-human generated content generation system;

flag one or more portions of the project for review when the comparison between the audit trail and predetermined set of criteria suggest the one or more flagged portions fall outside of acceptable editing parameters for the predetermined set of criteria; and presenting to the reviewer the analysis of the audit trail and the one or more flagged portions of the project.

13. A system for alerting a reviewer to the detection of non-human generated content during creation of a new original project on a user's device according to claim 12, wherein the verification system is further configured to generate a human generation score to quantify a likelihood of the project being created with an artificial intelligence system.

14. A system for alerting a reviewer to the detection of non-human generated content during creation of a new original project on a user's device according to claim 12, wherein the one or more flagged portions of the project for review are displayed as an interactive heatmap over the completed project.

15. A process for alerting a reviewer to the detection of non-human generated content during creation of a new original project on a user's device, comprising:

opening an editing session between the user's computing device and a ledger creation module, wherein the ledger creation module is configured to:

capture user edits to the new original project during one or more editing sessions as editing information;

save the editing information associated with each editing session in response to a command from the user's computing device to end the editing session; and mark the new original project as complete or incomplete at the end of each editing session; and generate an audit trail for the completed project based on editing information from each editing session making up the completed project;

analyzing the audit trail for a completed new original project with a verification system in communication with the ledger creation module by comparing the editing information against a predetermined set of criteria indicative of the use of a non-human generated content generation system;

flagging one or more portions of the project for review when the comparison between the audit trail and predetermined set of criteria suggest the one or more flagged portions fall outside of acceptable editing parameters for the predetermined set of criteria; and presenting to the reviewer the analysis of the audit trail and the one or more flagged portions of the project.

16. A process for tracking a creative process for a project according to claim 1, wherein flagging one or more portions of the project for review comprises displaying an interactive heatmap over the flagged portions.

* * * * *